US011104324B2

(12) United States Patent
Jobson et al.

(10) Patent No.: US 11,104,324 B2
(45) Date of Patent: Aug. 31, 2021

(54) ADAPTING A VEHICLE CONTROL STRATEGY BASED ON HISTORICAL DATA RELATED TO A GEOGRAPHICAL ZONE (71) Applicant: VOLVO BUS CORPORATION, Gothenburg (SE)

(72) Inventors: Edward Jobson, Romelanda (SE); Ulf Gustafsson, Gothenburg (SE); Martin Sanne, Gothenburg (SE); Roger Andersson, Vallda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/656,866

(22) Filed: Oct. 18, 2019

(65) Prior Publication Data
US 2020/0047742 A1 Feb. 13, 2020

Related U.S. Application Data (63) Continuation of application No. 15/735,019, filed as application No. PCT/EP2015/063369 on Jun. 15, 2015, now Pat. No. 10,486,682.

(51) Int. Cl.
*B60W 20/12* (2016.01)
*B60W 50/00* (2006.01)
(Continued)

(52) U.S. Cl.
CPC .............. *B60W 20/12* (2016.01); *B60L 7/18* (2013.01); *B60W 10/06* (2013.01); *B60W 10/08* (2013.01);
(Continued)

(58) Field of Classification Search
CPC ......... Y02T 10/00; Y02T 10/40; Y02T 10/50; Y02T 10/60; Y02T 10/62; Y02T 10/6213;
(Continued)

(56) References Cited

U.S. PATENT DOCUMENTS 9,140,565 B2 9/2015 Taguchi
2003/0078707 A1* 4/2003 Shioda .................. B60W 20/00
701/22
(Continued)

FOREIGN PATENT DOCUMENTS

EP 1297982 A2 4/2003
EP 1288887 A3 5/2003
(Continued)

OTHER PUBLICATIONS

International Search Report and Written Opinion for International Patent Application No. PCT/EP2015/063369, dated Feb. 12, 2016, 11 pages.
(Continued)

*Primary Examiner* — Anthony R Jimenez
(74) *Attorney, Agent, or Firm* — Withrow & Terranova PLLC (57) ABSTRACT A method and system are provided for adapting a vehicle control strategy of an on-road vehicle following a reoccurring fixed route to a predetermined destination, which fixed route extends through at least one geographical zone associated with at least one environmental restriction. When it is determined that the vehicle is approaching the geographical zone, historical data collected from previous passages of one or several vehicles through the zone is accessed, and the vehicle control strategy inside the geographical zone is adapted based on the historical data and the environmental restriction.

19 Claims, 5 Drawing Sheets (51) Int. Cl.
| | |
|---|---|
| *G08G 1/123* | (2006.01) |
| *G08G 1/00* | (2006.01) |
| *G08G 1/133* | (2006.01) |
| *G01C 21/34* | (2006.01) |
| *B60W 20/11* | (2016.01) |
| *B60L 7/18* | (2006.01) |
| *B60W 10/06* | (2006.01) |
| *B60W 10/08* | (2006.01) |
| *B60W 20/40* | (2016.01) |
| *B60W 20/17* | (2016.01) |
| *B60W 20/16* | (2016.01) |

(52) U.S. Cl.
CPC ............ *B60W 20/11* (2016.01); *B60W 20/40* (2013.01); *B60W 50/0097* (2013.01); *G01C 21/3492* (2013.01); *G08G 1/123* (2013.01); *G08G 1/133* (2013.01); *G08G 1/207* (2013.01); *B60L 2240/62* (2013.01); *B60W 20/16* (2016.01); *B60W 20/17* (2016.01); *B60W 2050/0089* (2013.01); *B60W 2300/10* (2013.01); *B60W 2520/10* (2013.01); *B60W 2530/10* (2013.01); *B60W 2530/14* (2013.01); *B60W 2555/20* (2020.02); *B60W 2555/60* (2020.02); *B60W 2556/50* (2020.02); *B60W 2556/65* (2020.02); *B60W 2710/18* (2013.01); *B60W 2710/244* (2013.01); *B60W 2710/305* (2013.01); *B60Y 2200/143* (2013.01); *G01C 21/3461* (2013.01); *G01C 21/3469* (2013.01); *Y10S 903/93* (2013.01)

(58) Field of Classification Search
CPC ....... Y02T 90/00; Y02T 90/16; Y02T 90/161; Y02T 90/162; Y02T 90/163; G05D 2201/00; G05D 2201/02; G05D 2201/0213; B60P 1/00; B60P 3/00; B60L 2260/00; B60L 2260/20; B60L 2260/26; B60L 2260/40; B60L 2260/42; B60L 2260/44; B60L 2260/46; B60L 2260/48; B60L 2260/50; B60L 2260/52; B60L 2260/54; B60L 2260/56; B60L 2260/58; B60L 2240/00; B60L 2240/10; B60L 2240/40; B60L 2240/42; B60L 2240/421; B60L 2240/44; B60L 2240/54; B60L 2240/60; B60L 2240/62; B60L 2240/622; B60L 2240/68; B60L 2240/70; B60L 7/18; Y10S 903/00; Y10S 903/902; Y10S 903/903; Y10S 903/907; Y10S 903/93; B60W 2550/00; B60W 2550/20; B60W 2550/22; B60W 2550/40; B60W 2550/402; B60W 2550/408; B60W 2710/18; B60W 2710/305; B60W 2720/00; B60W 2720/103; B60W 30/00; B60W 30/182; B60W 30/188; B60W 30/1882; B60W 2300/10; B60W 2300/12; B60W 2300/123; B60W 2300/125; B60W 2300/126; B60W 2300/14; B60W 2300/145; B60W 2300/15; B60W 2300/17; B60W 2300/26; B60W 2300/48; B60W 2300/205; B60W 2300/0089; B60W 2300/0097; B60W 10/06; B60W 10/08; B60W 20/00; B60W 20/10; B60W 20/11; B60W 20/12; B60W 20/13; B60W 20/15; B60W 20/16; B60W 20/17; B60W 20/20; B60W 20/40; B60W 50/00; G01C 21/34; G08G 1/123; G08G 1/00; G08G 1/133
USPC ......................................................... 701/22
See application file for complete search history.

(56) References Cited

U.S. PATENT DOCUMENTS

| | | |
|---|---|---|
| 2008/0167819 A1 | 7/2008 | Breed |
| 2010/0274422 A1 | 10/2010 | Schrey et al. |
| 2011/0246004 A1 | 10/2011 | Mineta |
| 2012/0290149 A1 | 11/2012 | Kristinsson et al. |
| 2018/0170349 A1 | 6/2018 | Jobson et al. |

FOREIGN PATENT DOCUMENTS

| | | |
|---|---|---|
| EP | 1842757 A1 | 10/2007 |
| EP | 2689982 A1 | 1/2014 |
| JP | 2003067893 A | 3/2003 |
| JP | 2004083274 A | 3/2004 |
| JP | 2012154822 A | 8/2012 |
| JP | 2013097607 A | 5/2013 |
| JP | 2013169915 A | 9/2013 |
| WO | 2013055830 A1 | 4/2013 |

OTHER PUBLICATIONS

International Preliminary Report on Patentability for International Patent Application No. PCT/EP2015/063369, dated Oct. 13, 2017, 6 pages.
Extended European Search Report for European Patent Application No. 19184411.7, dated Nov. 4, 2019, 8 pages.
Notice of Reasons for Refusal for Japanese Application No. 2017-566014, dated Jul. 2, 2019, 16 pages.
Office Action for Japanese Patent Application No. 2017-566014, dated Dec. 13, 2019, 8 pages.
Non-Final Office Action for U.S. Appl. No. 15/735,019, dated May 30, 2019, 9 pages.
Notice of Allowance and Examiner-Initiated Interview Summary for U.S. Appl. No. 15/735,019, dated Oct. 1, 2019, 9 pages.
Reason for Rejection for Japanese Patent Application No. 2017-566014, dated Apr. 28, 2020, 7 pages.
Examination Report for Indian Patent Application No. 201747047059, dated May 4, 2021, 5 pages.

\* cited by examiner

ADAPTING A VEHICLE CONTROL STRATEGY BASED ON HISTORICAL DATA RELATED TO A GEOGRAPHICAL ZONE

The present application is a continuation of U.S. patent application Ser. No. 15/735,019, filed Dec. 8, 2017, which is the U.S. national stage of International App. PCT/EP2015/063369, filed Jun. 15, 2015, both of which are incorporated by reference.

BACKGROUND AND SUMMARY

The present invention relates to vehicles travelling along a fixed route passing through geographical zonas associated with one or several environmental restrictions. In particular, the invention relates to adapting a vehicle control strategy based on the restrictions.

Environmentally sustainable solutions are sought after in numerous fields of technology and industries, particularly in the automotive industry. Even though a lot of progress has been made in the automotive industry with for example hybrid vehicles, electric vehicles, improved fuel efficiency and efficient exhaust gas catalysts there is still incentive and opportunities for further improvements. However, in parallel with automotive development efforts are made by governments and organizations to guide the evolution of vehicles towards more sustainable solutions by penalty taxes, restrictions, etc.

A recent trend, particularly in urban areas, is to provide restrictive areas or zones in which certain requirements are put on the vehicles and indirectly on the drivers, for example low emission zones, low noise zones, reduced speed zones, studless tire zones, etc. A road user operating a vehicle may thus encounter several zones or segments along a route posing various driving requirements car restrictions. The zones or segments may for example be geographical areas, road segments, tunnels, school areas, indoor bus-stops, etc. For example some zones may pose environmental requirements on vehicles traveling in or passing through these zones, such as e.g. low/zero emission zones or low noise zones, and these zones may be of various classes, i.e. the requirements may be stricter in some zones than other. Further, some zones Segments may pose safety requirements, such as e.g. speed limitations, axle weight limitation, mandatory stops, right of way, narrow road, dangerous road, pedestrian streets, slippery road, etc. Thus, there may be various driving requirements associated with the aforementioned zones or segments. A safety requirement as mentioned may be a speed limitation, i.e. in some zones adaptation of the vehicle or driving strategy may be to limit the top speed of a vehicle, for example near a school or other places where there are a lot of pedestrians present, or for example near a bus stop for buses.

However, for road users these areas and restrictions may result in additional stress, increased distraction and, as a consequence potential safety hazards. In particular these restrictions often result in stressful situations for road users which are unfamiliar with the local area which may cause them to pose a risk in traffic, but also for professional drivers such as bus drivers already operating under rather stressful conditions.

To this end, attempts have been made to facilitate the situation for road users, such an attempt is e.g. disclosed in EP2153175 which provides a navigation system for a motor vehicle in which information about the geographic location of low emission zones is presented to the driver and, if the vehicle can't comply with the restrictions, the driver is provided with an alternative route.

However, this solution is limited in many ways, and does also not completely solve the problems associated with the increasing number of restrictive zones and the different types of restrictions. For example, it might not always be a viable alternative for a road user to avoid certain areas or zones, and moreover there is still a need for an improved method for adapting a control strategy of the vehicle in order to handle requirements of these zones.

These problems are particularly important for busses or other vehicles travelling along a reoccurring fixed route.

Further attention is drawn to US2012290149, disclosing a computer implemented method includes examining a travel route to determine the presence of emission control zones along the route. The method further includes determining how much power will be required to operate a vehicle along the portions of the route within the emission control zones.

In EP2689982, there is provided a method of determining power source switching for a hybrid electric vehicle, HEV, based on its battery status and pollution information along the planned route.

EP1288887 presents a system and method for providing control grain of a vehicle and, more particularly, to system and method for providing running characteristics of a vehicle which match the preferred drive feel and living environment of a driver by sharing environment data and learned data with a plurality of other drivers.

In US2011246004, there is disclosed a method for determining minimum energy routes for a motor vehicle.

Finally, WO2013055830 relates to a method of charging an energy storage system for an electric vehicle.

It is therefore desirable to provide a method for adopting to restrictive zones or segments in a route, which alleviates all or at least some of the above-discussed drawbacks of the presently known systems.

The invention, according to an aspect thereof, is based on the insight that vehicles travelling along a reoccurring route may have significant use of historical data relating to previous passages along the route, in particular when adapting a vehicle control strategy when considering environmental restrictions, such as emissions, noise, weight, speed, safety, etc.

By collecting historical data from vehicles passing through specific zones or segments of a route, and using this historical data to adopt a vehicle control strategy, it is possible to greatly aid drivers and reduce stress factors associated with driving automotive vehicles.

Further, the usage of historical data ensure that the predictions become more reliable and that they are more accurate the more vehicles pass through the zone and more data is thus collected.

The term "control strategy" may include any setting of control parameters related to the operation of the vehicle, as well as activities aimed at assisting the driver of the vehicle. In particular, the control strategy may relate to scheduling of battery charging, delaying or expediting particulate regeneration or a change, limitation or scheduling of any other operating parameter. Examples of operating parameters of a vehicle include e.g. speed, engine RPM (revolutions per minute), active gear, heater power, climate system compressor power, onboard media systems, lights/lamps, other onboard subsystems, etc. In case of a hybrid vehicle, an operating parameter may be drive mode, i.e. selecting electric or combustion engine propulsion, or selecting propulsion with different types of fuel or energy sources i.e. gasoline and ethanol, A reoccurring route may be understood as a route on which the vehicle travels frequently. A reoccurring route offers a greater opportunity for gathering data in which correlations between for example payload and location, speed and time of day or weather and battery discharge rate may be found. Furthermore, the expression "fixed" route is intended to indicate that the route may not be re-routed. A specific case of a reoccurring fixed route is a public transport line, such as a bus route. It occurs several times each day, and may not be re-routed (to any greater extent) as there are predefined bus-stops that need to be frequented. Other examples include some delivery routes, such as a mail delivery route.

When the vehicle is a bus, the step of adapting the vehicle control strategy may include predicting a future delay based on said historical data and updating a time schedule accordingly.

The historical data may include a number of operating parameters. For example, the historical data may include energy consumption for the one or several vehicles that have passed through the zone; it may further include how long time it took to pass through the zone, how many times the vehicle is brought to complete halt, engine load, number of unexpected stops/decelerations, etc. The historical data may further relate to for example vehicle weight, tire pressure, selected gear, activation state of the climate system, interior temperature.

The historical data may be used as a base for predicting or estimating a future state of a vehicle's operating parameters by comparing with similar historical states and how the states develop under similar conditions. The historical data may for example be used to reach or approach a desired state by adapting a vehicle control strategy to settings associated with a desired state or with a development leading to the desired state. The desired state may for example be a successful travel through the zone and/or the historically most energy efficient travel through the zone.

According to an aspect of the invention, the historical data is tagged based on at least one parameter, and the method further comprises selecting relevant historical data based on a current or forecasted parameter.

The parameter can be a driving condition, such as traffic density, weather, etc, a geographical position in relation to the zone, a type of vehicle, or any other parameter that can be expected improve selection of relevant historical data. Historical data which is not associated with the current parameter may be disregarded making the method more efficient. Alternatively, the differently ragged data may be weighted to arrive at a suitable vehicle control strategy.

For example if the parameter is "heavy snowfall", the historical data that was collected during heavy snowfall may then be used when adapting the vehicle control strategy, e.g. with respect to operating parameters such as available torque, etc. Historical data collected during sunny weather may be disregarded, or at least assigned less weight.

In a particular embodiment the tagging parameter is time related, and may be time of year, time of month, weekday, time of day, etc. For example, during certain hours of the day the road might be empty (e.g. late at night), and mainly using historical data showing energy consumption when passing through that zone for that specific time of the day (e.g. late at night) might provide a more accurate estimation of the needed energy level in an onboard energy storage unit if a passage through that specific zone is to be performed solely on electric drive. Consequently, an unnecessary stop to charge the battery/batteries at a charging station may be avoided which will save large amounts of time. Another example may be a zone with an axle-weight restriction during particular hours of the day; if that zone is being approached by a vehicle with an axle-weight above the allowed limit may then be allowed to pass during off-hours and offered an alternative route during hours of prohibition, thus resulting in one less thing for a driver to worry about.

Furthermore, the tagging parameter may be a location relative to the zone. For example, historical data related to a state of charge of a battery at different specific locations along the route may be selected based on the current location. This may also be combined with a time related tag, e.g. a state of charge historically occurring at a specific location along the route on Tuesday mornings between 8 and 9.

The method may further include accessing an onboard information system to acquire current vehicle data.

The current vehicle data is here intended to include any data relating to the vehicle or its immediate surroundings. In other words, it may include internally detectable information (e.g. speed, battery charge) as well as externally detectable information (e.g. outside temperature).

For example, the current vehicle data may be emission data for the vehicle, state of charge (energy level) of one or several onboard energy storage units, engine temperature, cabin temperature, type of tires, noise level, vehicle height data, vehicle axle weight data, fuel consumption rate, vehicle speed, etc. This current vehicle data is then used together with the historical data for the zone that is being approached by the vehicle to adopt the vehicle control strategy, e.g. to ensure compliance with the driving requirement(s) of that zone.

Moreover, current vehicle data may also be data gathered in real-time from vehicles driving the same reoccurring route, e.g. a bus some minutes a head operating in the same bus line. In this way a very accurate prediction can be made if the vehicle will be able to comply with the driving requirements associated with a particular zone. For example, if a bus is driving along a bus route, and approaching a zone with low/zero emission requirements during some divergent public event, e.g. a concert or a sports event, and the buses that have previously passed the forthcoming stop indicate an increasing number of passengers the vehicle may be adapted to compensate for the additional load by allowing a higher state of charge of the onboard energy storage unit so to comply with the low/zero emission requirement associated with the zone that the bus stop is positioned in regardless of the abnormal event.

The method may further comprise the step of collecting data during passage of said zone, and communicating the collected data to the historical data in said database. At the same time as the vehicle makes use of historical data to adopt its vehicle control strategy, data from its passage through the zone may be stored, thereby contributing to the historical data in the database. In this way, the system becomes self-learning, and consistently improves.

In some embodiments, the step of adapting the vehicle control strategy includes adapting at least one operating parameter for optimizing energy consumption of said vehicle. This enables the vehicle to perform in an optimized way in regards to fuel efficiency and energy consumption and not only for compliance with driving requirements set out by zones or segments along the way. The method may also include a specific step of verifying that passage through the zone(s) while complying with environmental restrictions associated with the zone is possible.

For example if the zone that is being approached is a low/zero emission zone and the vehicle is a hybrid electric vehicle with an internal combustion engine and an electrical motor, the vehicle data may be used to determine state of charge (energy level) of the onboard energy storage unit and then to make sure that there is enough charge to allow the vehicle to proceed through the zone solely on electric drive. For example, an adaptation of the vehicle or driving strategy may be then to allow the battery to be charged by powering a generator with the internal combustion engine, and perhaps also turn off the compressor of a climate system in the cabin if it is determined to be necessary in order to ensure compliance with the low/zero emission requirement. Alternatively the vehicle may be directed towards a charging station to charge the onboard energy storage unit before entering the low emission zone. Furthermore, the historical data and vehicle data may be used in combination to make an improved prediction regarding if the vehicle will comply with driving requirements dictated by the zone when passing it.

Moreover, there are many environmental benefits associated with providing more accurate predictions of energy consumption through certain zones or road segments by optimizing fuel efficiency. Additionally a battery in an electric vehicle can be utilized in a way to maximize the life length of the battery. By keeping a charge status within a preferred charge level the battery, life is increased. The present invention allows for usage of historical data, which may be real time data from vehicles ahead, vehicles which perhaps passed the zone which is currently being approached only a short while ago, to assess future energy need. Thus, when the battery is being charged, either at a charging station from the electric, grid or from an on-board power source, such as e.g. an internal combustion engine, a preferred state of charge can be set so that the vehicle may complete the assignment (e.g. pass through the zone purely on electric drive, in case of an zero emission zone or low noise zone) and minimize the battery wear, simultaneously.

Even further, in another exemplary embodiment the vehicle may have an electric drive mode, and wherein the at least one operating parameter includes activation of regenerative braking. As previously discussed some vehicles, e.g. hybrid electric vehicles may have two driving modes, an electric drive mode or a combustion engine drive mode. Many of these types of vehicles have a regenerative braking feature so to utilize the energy resulting, from braking of the vehicle, thus an operating parameter may be to activate this regenerative braking for example if the state of charge in an onboard energy storage unit needs to be increased and the combustion engine cannot generate a high enough state of charge on alone.

In one exemplary embodiment the adapting of operating parameters includes selective deactivation of energy consuming onboard subsystems. Onboard subsystem might be heaters, air condition, infotainment systems, etc. This may for example be used either to ensure the state of charge in a battery and/or to comply with driving requirements in zones with noise restrictions, or if for example a zone is located indoors and the associated requirements with indoor driving e.g. no heater use.

Further, according to one exemplary embodiment, the at least one operating parameter includes scheduling of an onboard electrical energy storage unit by one of a combustion engine and external power source.

Furthermore, the historical data may include payload changes in or along the zone. With reference to public transportation (e.g. buses) "payload" may refer to number of passengers and differences in the number of boarding passengers at one or several stops within a particular zone. The differences may be depending on time of day, weather, public events, etc. This information may be particularly relevant for providing driver assistance. Not only does it affect the weight of the vehicle, but with an increased number of passengers there is an increased risk that one or several passengers are standing up.

In another exemplary embodiment the fixed route extends through at least one additional geographical zone associated with at least one environmental restriction, and wherein said step of adapting said vehicle or driving strategy is based also on a requirement of said additional zone and historical data collected from previous passages of one or several vehicles through said additional zone.

In this scenario the adaption of the vehicle control strategy ay consider all or some of the zones along the fixed route. Zones or segments with environmental restriction may be geographically directly connected to one another; however, there may also be intermediate zones without environmental restriction placed in between some or all of the zones with environmental restriction.

By including also restrictions from additional zones along the fixed route, the quality of the driving strategy may be further improved. For example, the state of charge in an onboard energy storage unit must be sufficient not only to comply with a possible first low/zero emission zone, but also in the case where there is another low/zero emission zone close by. In particular if there would not be possible or optimal to charge the battery between the two low/zero emission, zones.

According to a second aspect of the present invention, an on-board system fir adapting a vehicle control strategy of an on-road vehicle is provided.

Advantages and variations are in large similar to those discussed above with respect to the first aspect of the invention. For example, the control unit may be configured to select relevant historical data based on a current or forecasted condition, and/or configured to access an information system, and/or configured to communicate current vehicle data and/or the determined position to the database, and/or configured to receive current vehicle data from another vehicle travelling along the fixed route, and/or configured to predict a future delay based on said historical data and updating a time schedule accordingly.

A further aspect of the invention relates to a plurality of vehicles each comprising a system according to the second aspect of the invention, wherein the vehicles travel along a common fixed route at separate incremental positions, and wherein vehicle data of a preceding vehicle of the plurality of vehicles is comprised in the historical data for access by a following vehicle of the plurality of vehicles.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

All the figures are highly schematic, not necessarily to scale, and they only show parts which are necessary in order to elucidate the invention, other parts being omitted or merely suggested.

DETAILED DESCRIPTION

In the following detailed description, preferred embodiments of the present invention will be described. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. Furthermore, in the context of the invention the terms zone, segment or road segment are to be understood as essentially describing a part of a geographic area which may only extend along a segment of a road or cover a larger area through which a portion of a road extends. The zones or segments are mainly represented by dashed or dotted lines in the figures.

Figure 1:
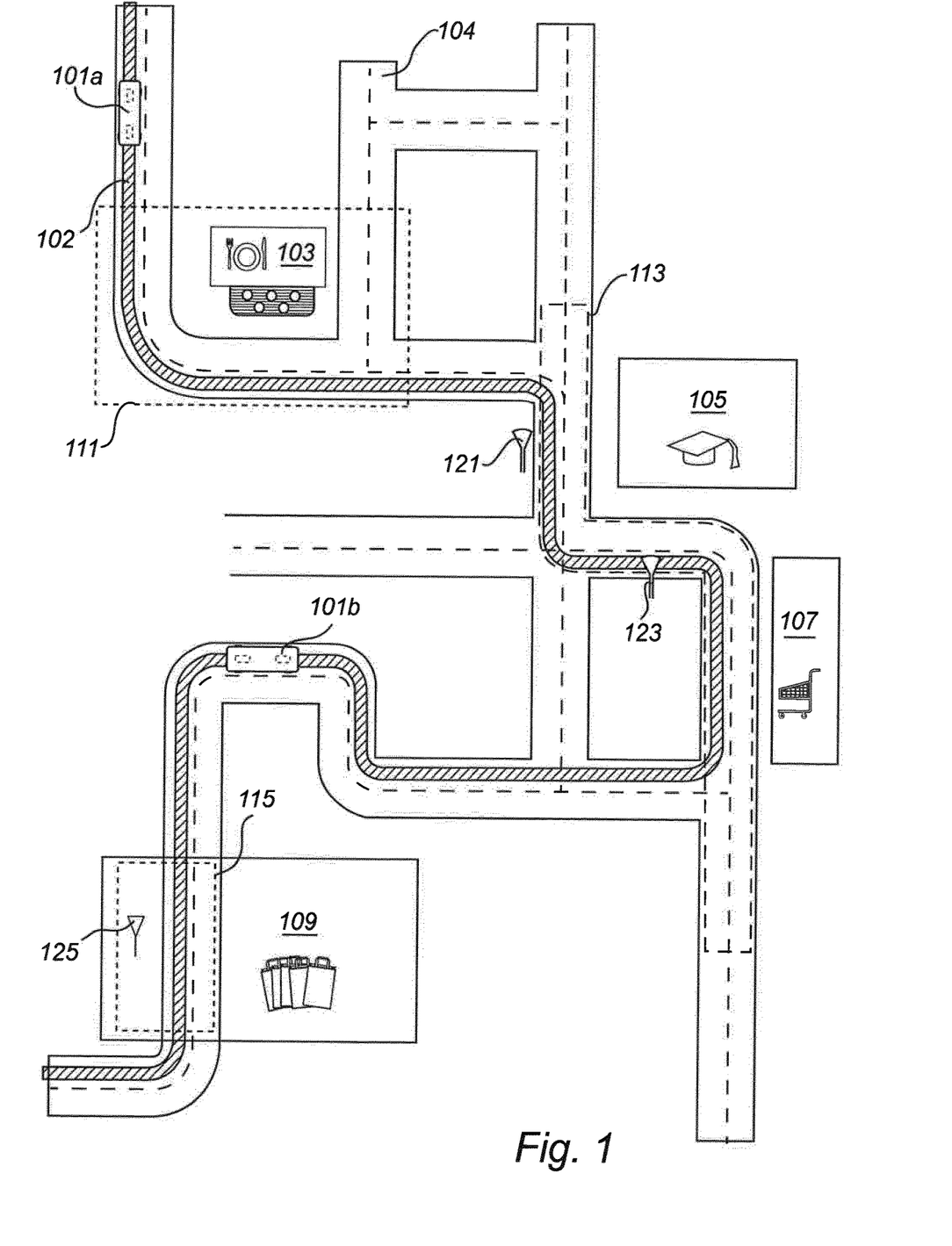
FIG. 1 is a schematic illustration of a bus line operating with a system in accordance with an embodiment of the present invention.

FIG. 1 shows a schematic overview of a bus route or a bus line 102 on a road map 104 in accordance with an embodiment of the invention. The bus route 102 is an illustrative line without any physical representation. The figure illustrates a bus 101a driving along the route 102 and approaching a first zone car segment 111. The route 102 may be a fixed route with a predetermined destination; it may also be a reoccurring route similarly to a bus line operating in an urban area, e.g. a city bus. A second bus 101b operating along the same bus route 102 is also illustrated in the FIG. 1, the buses 101a, 101b may be hybrid electric buses or electric buses but will however be referred to as buses in the following.

In a first step it is determined that the bus 101a is approaching a first zone or road segment 111. This may be done in various ways by an on board positioning unit, such as, e.g. an onboard navigational system (e.g. a GPS system) with stored and accessible map data comprising geographical information about zones and road segments and the associated driving requirements. Alternatively or in addition, a detecting unit may be suitably arranged so to determine that a zone is being approached by sending and receiving a signal, moreover driving requirements may be sent/received in this way as well. In this exemplary embodiment zone 111 is associated with a café or restaurant 103, resulting in a zero emission requirement and a low noise requirement near the café 103, i.e. within the zone 111.

Next, an onboard information system (e.g. CAN) for acquiring vehicle data is accessed; preferably the vehicle, data includes information about the onboard energy storage unit, (state of charge/energy level, condition, etc.) and the energy consumption rate of the bus 101a. Continuingly, a database is accessed, the database containing historical data collected from previous passages of the bus 101a (if it is a reoccurring route) and/or passages of other vehicles through the zone (such, as e.g. bus 101b). The historical data may be from any point(s) in time prior to the present point. The historical data may include energy consumption and time duration for a passage through the zone 111. The vehicle data together with the historical data is then used to base an adaptation of the vehicle operating parameter(s) in order to ensure compliance with the driving requirement(s) of the zone 111. The historical data can also include energy consumption and time duration of all zones present along a fixed route and the adaptation of the operating parameters may be done in consideration of all possible driving requirements as dictated by the zones present along the fixed route.

The adaption per may be executed in different ways by an onboard vehicle computer, it may be performed as a passive "recommended driver action" displayed on a user interface for the driver to see, as "active limitation", e.g. in case of a speed limitation, torque is removed until a speed criteria is reached or as "active control", e.g. in case of a speed limitation, brakes are activated to reach the speed criteria.

Further, along the route 102 there is a segment 113, where there is a school 105 and a super market 107 nearby, the segment 113 includes a safety requirement such as a speed limitation for certain hours of the day or certain days of the week, for example between 08:00 and 16:00 on working days. There are also two bus stops 121, 123 along the segment 113; the bus stops may comprise charging capabilities (not shown) for the onboard energy storage unit within the bus 101a.

An onboard vehicle control unit may impose a "virtual speed bump" when the bus approaches the segment 113, for example by limiting engine torque until speed is below the required limit or by actively braking until speed criteria is reached (i.e. active limitation or active control). Zones or segments which are associated with safety requirements may also utilize real-time information about various conditions/parameters (e.g. weight, weight distribution, etc.) in order to lower the chances of accidents occurring. For example a vehicle, such as a bus, carrying a heavier load (more passengers) may be required to travel at a lower speed than an essentially empty bus, thus, the driving requirements associated with some zones may be dynamic and depend on various parameters retrieved from the information system of the vehicle.

A third zone 115, is also present along the route 102 and it is associated with a shopping mall 109, there is also a bus stop 125 within the zone 115, this third zone 115 can for example be located within the shopping mall 109, i.e. it may be indoors. Driving requirements for zone 115 may accordingly be zero emission, low noise, speed limitation, etc. Accordingly the onboard vehicle control unit may switch the bus 101a to a full electric drive mode, and turn off energy consuming subsystems in order to reduce energy consumption but also reduce noise disturbance from e.g. fans, while traveling in the zone 115. Moreover, an adaption of operating parameters may be to charge air tanks with an (onboard) air compressor prior to entering a zone with low noise requirements in order to avoid noises from the compressor while traveling in the zone 115.

In one exemplary scenario/embodiment, the bus 101a is operating during rush-hour traffic, and the accessed historical data is tagged with a driving condition including a time stamp indicating increased payloads (passengers) at all or some of the bus stops 121, 123, 125 during these hours as compared to other hours of the day. This increase in payload is considered when performing an adaption of the operating parameter(s), e.g. an onboard energy storage unit within the bus 101a may be charged to a higher state of charge as compared to cases with a normal payload, for example by spending more time at a charging station or allowing an internal combustion engine to charge the onboard energy storage unit for a longer duration of time between the zero emission zones 111, 115. This is done so to ensure that the bus 101a can comply with the zero emission requirements dictated by zones 111 and 115, i.e. having enough charge in the onboard energy storage unit to be able to pass through the zones solely on electric drive. Moreover, the historical data nay further be tagged with vehicle type, i.e. if the database with historical data is being accessed by a bus, it may only retrieve historical data tagged with bus as a vehicle type and along the same reasoning a car may only retrieve historical data tagged with car as a vehicle type, and so on. This may be beneficial to arrange the historical data so that unnecessary information is not retrieved, for example data regarding how many passengers boarded a bus at some bus stop may not be relevant for a user driving a car or a truck.

Further, real-time data may be used when assessing the required adaptation of an operating parameter. For example regarding the energy level needed in the onboard energy storage unit within the bus 101a. Such a scenario might be when bus 101a is approaching bus stop 125, only a very short while (e.g. less than a minute) after bus 101b was there to collect passengers, the control it/onboard computer may allow a lower energy level in the energy storage unit of bus 101a as it is likely that there will not be a lot of people waiting at bus stop 125 at that time, thus, resulting in a smaller payload for the bus to carry. Another example would be if there is an unforeseen event in zone 115 which will momentarily increase the time duration of a passage through the zone 115 (e.g. an accident, demonstration, public event, etc) which was recorded and uploaded to the database by bus 101b, hence an adaptation of the energy level of the onboard storage unit to adjust for this prolonged time duration may be enforced by the control unit in bus 101a. This could be an unforeseen decrease in road quality which was picked up a sensor arranged on or near the suspension of the vehicle(s), i.e. road quality evaluation performed by a suspension signal.

In one illustrative exemplary scenario the route 102 as illustrated in FIG. 1 comprises three zones or segments 111, 113, 115 all of which may be associated with low or zero emission requirements. For example, if the bus 101a either has a predefined destination or operates alone a conventional circulatory bus line, the adaptation of the operating parameter(s) of the bus can be done with consideration taken to all the driving requirements associated with all zones present along a fixed route 102. Accordingly, if all of the zones 111, 113, 115 would be zero emission zones the system will determine if the energy level is high enough in the onboard energy storage unit of the bus 101a for it to pass through all the zones in for example pure electric drive mode (in order to comply with the zero emission requirements) and thus adapt the operating parameter(s) of the bus 101a accordingly. For example, the system may predict that the bus 101a may need to stop at a charging station somewhere along the route, or that some energy consuming onboard subsystem(s) may have to be turned off for a while, based on the acquired vehicle data and historical data. All of the operating parameters may also be adapted based on an overall fuel efficiency goal along the full route and/or optimization of battery lifetime together with the adaptations of the operating parameter(s) in order to ensure compliance with driving requirements as dictated by various zones.

Figure 2:
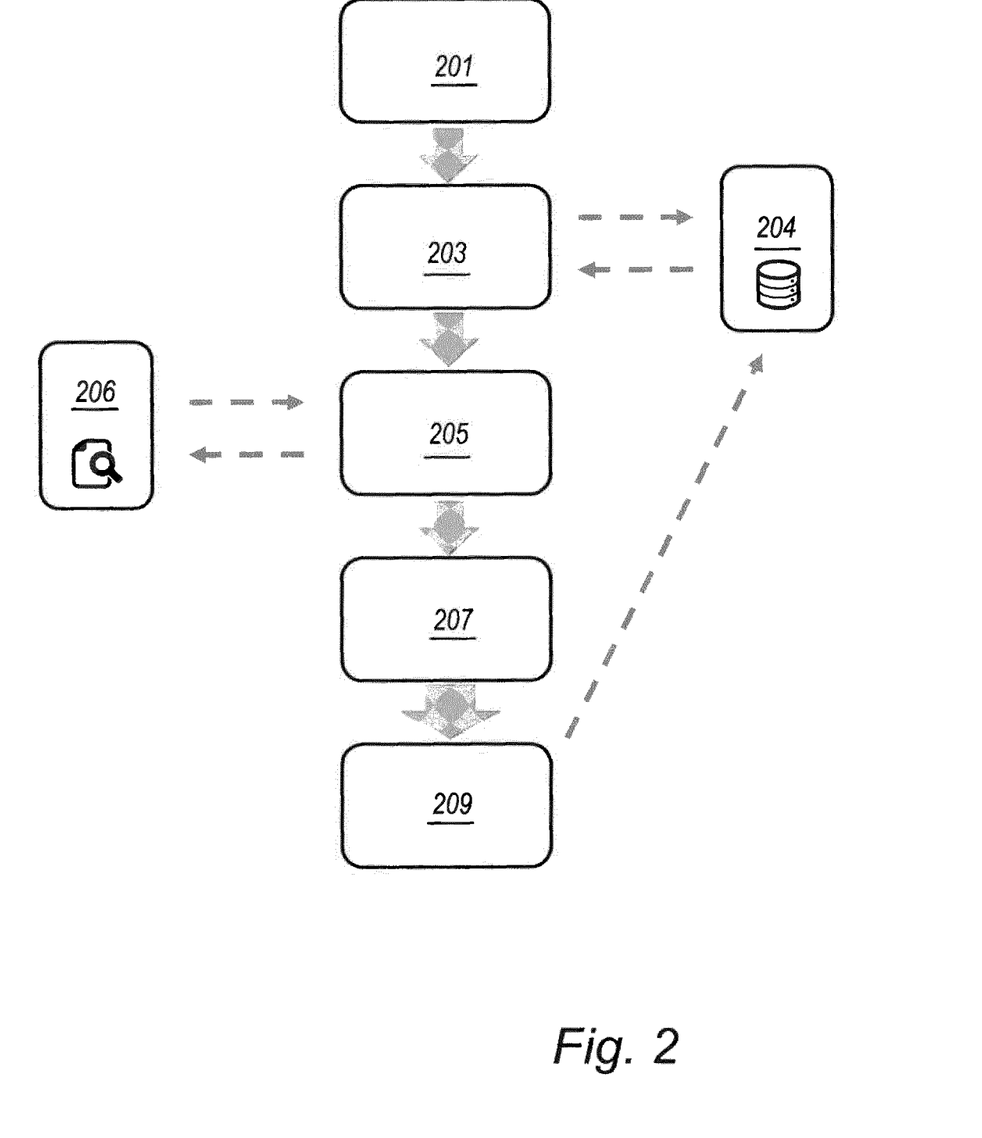
FIG. 2 is a schematic flow chart illustrating an operating parameter adaptation sequence in accordance with an embodiment of the present invention.

FIG. 2 illustrates a schematic flow chart of the operating parameter adaptation prior to entry into a zone with one or several driving requirements in accordance with an exemplary embodiment of the invention. Initially, an onboard positioning unit is used to determine 201 that a vehicle is approaching the zone. The step of determining that a vehicle is approaching a particular zone may be performed in various ways as known in the art. For example, an on board GPS-navigation system may be pre-programmed with the geographical location of various zones or segments, the system may also be connected to the internet or a similar proprietary network for real-time updates of zone locations and associated restrictions/driving requirements. Thus, the system may easily determine where the vehicle is headed based on predictions or in case a destination is selected in the navigation system. Alternatively or additionally the determining may be automatically detected by some detecting unit appropriately arranged in the vehicle which communicates with some external detecting unit arranged somewhere outside but in proximity to the associated zone. The detecting units may then communicate with each other and information regarding restrictions and/or driving requirements may be exchanged.

Next, a database 204 is accessed 203 in order to acquire historical data collected from previous passages of one or several vehicles through the zone. The database 204 preferably comprises historical data including energy consumption and time duration for the one or several vehicles that has passed through the zone. The database 204 may be remotely located in reference to the vehicle, and accessible via any suitable wireless means comprised by the vehicle, e.g. 3G, LTE, 4G, 5G, WiMAX, etc. as known in the art.

Further, an onboard information system 206 (or onboard information network) is accessed 205 in order to acquire vehicle data from an onboard information system 206. Moreover, the information system 206 may comprise vehicle data such as e.g. state of charge of one or several onboard energy storage units, engine temperature, cabin temperature, type of tires, noise level, vehicle height data, vehicle axle weight data, fuel consumption rate, vehicle speed, geographical position, etc. Next, one or several operating parameters of the vehicle are adapted 207 based on the historical data retrieved from the database 204 and the vehicle data retrieved from the onboard information system 206 in order to ensure compliance with the one or several driving requirements associated with the zone that is being approached.

Once a passage through the zone is completed 209 the vehicle may send/transfer 210 information to the database 204 so to increase the accuracy of future predictions regarding the need for adaption of operating parameters. For example if a passage through a zero emission zone was unsuccessful due to an insufficient energy level in an onboard energy storage unit. Then this information is transferred 210 to the database in order to minimize the number of unsuccessful passages for example by enforcing a higher energy level in onboard energy storage units of subsequent vehicles attempting to pass through the zero emission zone. The data may be transferred 210 by an ECU to the database 204 if demanded or requested by the database 204, alternatively or additionally the ECU may transfer 210 the information directly or within preset time periods.

Figure 3A:
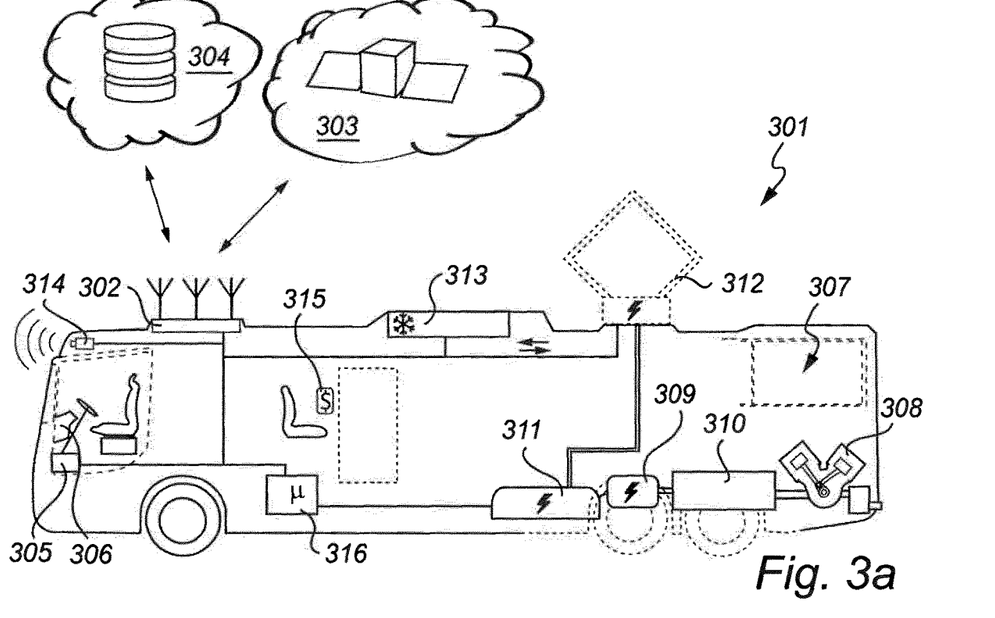
FIG. 3a is a schematic illustration of a bus in accordance with an embodiment of the present invention.

FIG. 3a illustrates a schematic representation of a vehicle 301 in accordance with an exemplary embodiment of the invention, in this example a bus 301. The bus 301 is adapted for carrying a number of seated and/or standing passengers along one of several routes in a city, as was illustrated with reference to FIG. 1. Furthermore, the bus 301 comprises a number of chassis components, body components, driveline components, interior components, signaling components, comfort components, etc. wherein the components may have one or more actuating functions and/or one or more sensing functions and with increased computerization of vehicles there is also an increased portion of the components that are either provided with a computer or control unit, for example an electronic control unit (ECU) in general uses or to provide a specific example an engine control unit. Alternatively, a component may comprise a sensor which is connected to an ECU via a direct connection, for example a wheel speed sensor which may be connected to a brake control unit via a wire. Similarly a component may comprise an actuator connected to an ECU, for example a throttle at the intake of an internal combustion engine being connected to the engine control unit. Consequently, the ECUs may advantageously gather data from a plurality of sensors and determine aggregated data from the sensor data. Furthermore, the ECUs may be adapted to determine a desired output for one or more actuators as well as provide corresponding control signals for the collected actuators. Furthermore, two or more ECUs may be connected in a network so that they may share data and also send and receive commands to and from each other. The bus 301 is provided with a number of such components, ECUs, sensors and actuators.

For example, in order to determine a current position of the bus 301 it is provided with a communication interface 302 comprising a number of antennae or transmitters/receivers for wireless communication. There is for example a receiver and a positioning unit (not shown separately from the communication unit 302) for a satellite based positioning system 303 such as the GPS mentioned in a previous example and/or a system based on GLONASS, BeiDou or GALILEO. The positioning unit may advantageously comprise an on board map database (not shown) wherein for example zone data, zone requirements or zone restrictions may be pre-installed. Furthermore, the map database may be updated, wirelessly and/or provided from an external source via a physical media data carrier such as a flash memory, DVD, hard disc drive or via a wired connection at or example charging stations, bus stops or garages. The communication interface 302 further includes an antenna and a unit for communicating, with the database for historical data 304. As indicated by the arrow the communication interface may provide two way communication with the database for historical data 304.

Each of the positioning unit and the unit for communicating with the database for historical data 304 may be allocated as physical components or modules on a chip or as virtual modules in a program code running on for example a micro processor. Alternatively they may each be allocated to individual units, for example individual physical ECUs and connected to a vehicle network, also referred to as an on board information system. The allocation of units to individual physical ECUs or to an ECU shared with one or more other units may be similarly applicable for any other unit comprised in the bus 301.

Furthermore, the bus 301 comprises a number of other components such as steering wheel and pedals 305 for determining inputs of a driver. An instrument cluster 306 for providing the driver with information, a climate system 313, an active safety system with camera and/or radar sensor 314, a passenger management system 315 for handling fares and safety of passenger doors and a central control unit 316.

Further, in the exemplary embodiment illustrated in FIG. 3a the bus 301 is provided with a hybrid driveline 307 having both an internal combustion engine (ICE) 308 and an electric motor 309. The driveline 307 further comprises a transmission 310, and the electric motor 309 is connected to an electric energy source 311, for example a battery. Furthermore, the battery 311 may be connected to an overhead contact system 312, for example a pantograph, for enabling charging of the battery 311 at charging stations. Each of these components are provided with an ECU adapted for acquiring, data that is relevant for the corresponding component, partly from sensors that are arranged on the corresponding component and partly from sensors that are arranged on other components. For example, the transmission 310 may comprise sensors for measuring transmission oil temperature, output shaft rotational speed, etc. and the ECU of the transmission 310 may also acquire sensor data from the ECU of the ICE 308 to learn the RPM of the ICE among other data. Furthermore, each of the ECUs of these components is adapted for determining a best mode of performing the functions of the respective components, partly based on for example the previously mentioned sensor data and partly based on operating states that may be manually selected by the driver, or scheduled or requested/commanded by another ECU, etc. For example, the driver may select an operating state that engages manual gear shifting or automatic gear shifting by sending a request to the ECU of the transmission 310, diesel particulate filters have a regeneration process that may have a scheduled operating mode in the ICE 308 and a passenger detection system ECU (not shown) may determine if a passenger is in risk of being squeezed in the door and consequently request/command that an ECU of a brake system (not shown) maintains or releases parking brake operating state. Each ECU may in the form of signals on an on board information system broadcast both corresponding sensor data from a number of connected sensors and operating state data from a number of connected actuators. Operating state data may further indicate an internal operating state for the respective ECU, for example a variable indicating a setting in the ECU, a fault code, a program mode being run. Each ECU may furthermore listen to or acquire data from the broadcasted signals of the other ECUs.

Figure 3B:
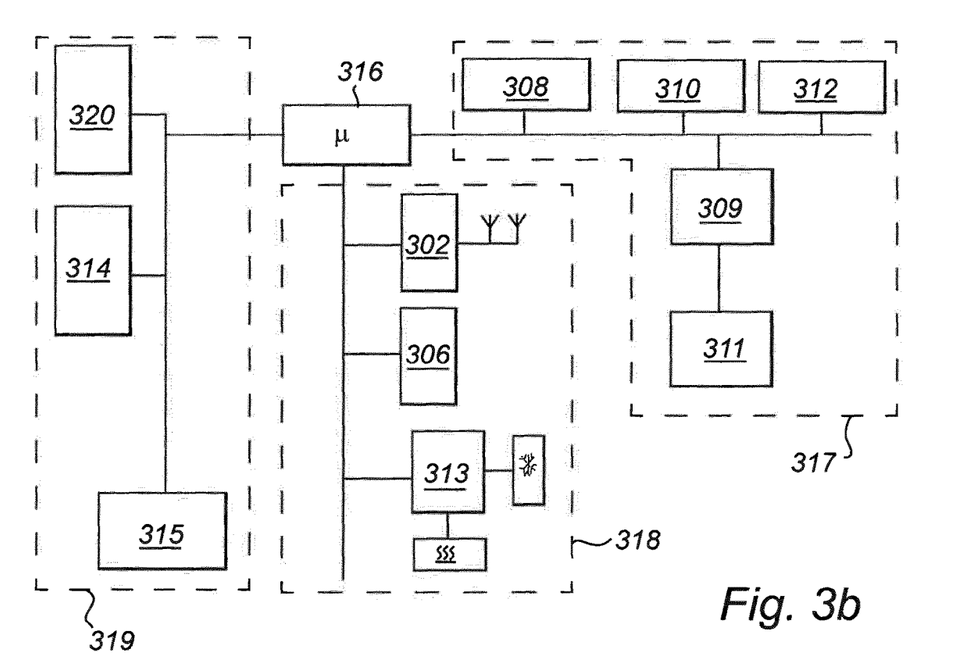
FIG. 3b is a schematic illustration of a vehicle information system of the bus illustrate in FIG. 3a, FIG. 4 illustrates a vehicle approaching a low/zero emission zone, as viewed from above, in accordance with an embodiment of the present invention.

FIG. 3b schematically illustrates an on board information system comprising three network buses, for example three CAN buses. In the context of the invention the on board information system may be interpreted as a vehicle control unit, an electronic control unit (ECU), a subsystem control unit, a vehicular sensor or a network of ECUs and/or sensors. For example one or more vehicle controller area networks (CAN) with implementation based on for example the Automotive electronics chapter of the Automotive Handbook by BOSCH and/or according to standards such as SAE J1939, AUTOSAR or any OEM-proprietary standard, which networks may be understood as exemplary embodiments of the on board information system. The passenger bus 301 illustrated in FIG. 3a may be provided with an on board information system as the one illustrated in FIG. 3b. For example, the ECUs of the driveline components may be comprised on a first CAN bus 317, the communications unit 302, the instrument cluster and an ECU of the climate system 313 may be comprised on a second CAN bus 318 and the ECU 320 of the brake system, an ECU of the active safety system 314 and the passenger management system 315 may be comprised on a third CAN bus 319. The central control unit 316 may work as a gateway in that it may relay any signal sent on one of the first 317, the second 318 and the third CAN bus 319, to one or both of the other CAN buses. Any function such as determining a vehicle control strategy for adaptation may be performed in the central control unit and sent for execution in one or more other ECUs, called sub systems. However, the determining of and adaptation to a vehicle control strategy may also be performed locally in one or more of the ECUs. This topology illustrated with FIG. 3b serves only illustrative purposes and should not be considered as limiting.

External current vehicle data may be acquired via the communication unit 302 and may, include traffic data received via a broadcaster or crowdsourced aggregated traffic information from a plurality of handheld devices or information received from a back office. Furthermore, external current vehicle data maybe received wirelessly, for example via a public or proprietary cellular radio network or via wired transmission for example at an electrical charging station.

Examples of signals made available through the components of the driveline 307 are current gear position, estimated ICE torque/power, estimated electric motor torque/power, measured fuel tank level, measured Ad-blue level, etc. Analogously, the ICE 308 may for example answer to a sent command and requesting an ICE torque/power, the transmission 310 may answer to a command requesting a gear position or a request to change from the ICE 308 to the electric motor 309 as propulsion source. A person skilled in the art will realize that a large number of signals may be made available over CAN, proprietary signals and/or standardized signals, such as for example signals required by the OBD 11 standard.

Each signal is advantageously given a time stamp which indicates the system time at which the signal was sent, wherein the system time may for example be set by a central control unit 316, or by the driver via an instrument panel or from a signal received from a back office via the communication interface 302. Consequently a data set is available by combining the signals from all the connected ECUs at a given point time, or over a time range with a predetermined sample rate. In combination with the determined position, which is part of a signal from the positioning unit it may be possible to provide a data set with correlation to the position and to the time. The datasets may be transmitted to the historical database 304. Furthermore, each dataset may advantageously be tagged with one or more operating conditions, these may be manually entered by the driver or by an operator at a back office with access to the historical database 304 or automatically provided by a tagging system, also with access to the historical database 304. For example, the driver may enter a tag to a dataset indicating that there was a traffic disturbance caused by supporters visiting a football match. In another example the user at the back office may enter tags to one or more data sets indicating that the datasets were recorded for a specific vehicle type or model, or during a holiday, or when the bus 301 is operating a less frequent winter schedule, or that there was some flooding, or that a reoccurring concert or festival was starting or ending at a venue close to a bus stop, etc. The tagging system may for example be a computer program in connection with the historical database 304 which tagging system may advantageously have an automated process for acquiring weather data, public holiday data, public event data, traffic disturbance data, traffic density data, etc. and for tagging each dataset with corresponding data.

After acquiring the historical data from the database 304 the data sets may consequently be selected, for example by the central control unit based on relevance to the current situation of the bus 301. For example, a set of comparable data comprising different states of charge of a battery at several incremental positions along the route may be selected based on that the set of data was collected on Tuesday mornings between 8 and 9 AM, during the summer schedule or when it is raining. Corresponding data relating to for example estimated vehicle weight, tyre pressure, selected gear, activation state of the climate system, interior temperature, etc. may provide basis for adaptation of the vehicle control strategy. For example among the data sets there may be a data set with the highest state of charge at most incremental positions, or at one or more incremental positions which are more relevant, for example which positions that are located in an emission restricted zone. This data set may be selected as the best mode and the central control unit 316 may respectively send requests/commands to one or more other ECUs to change to and/or maintain operating states which may be found in this data set. Alternatively, each ECU may individually determine a respective best mode based on historical data and adapt to a vehicle control strategy.

Furthermore, the historical data may be used as a base for predicting a future state of the bus' 301 operating parameters/states by comparing with similar datasets from the historical database and determine how the states develop under similar conditions. The historical data may for example be used to reach or approach a desired state by adaptation of the vehicle control strategy to approximate a historical state that is determined to represent a desired state or that has a development leading to the desired state. The desired state may for example be a successful travel through the zone and/or the historically most energy efficient travel through the zone. Furthermore, the prediction may provide estimated changes in payload at predetermined stops, such as a prediction of how many passengers are expected to enter and/or leave the bus 301 at one or more bus stops in a zone. A prediction may be advantageous in for example scheduling of battery charging by the ICE 308 prior to entering the zone or by requesting priority in charging by overhead contact system 312 at a preceding bus stop/garage.

Figure 4:
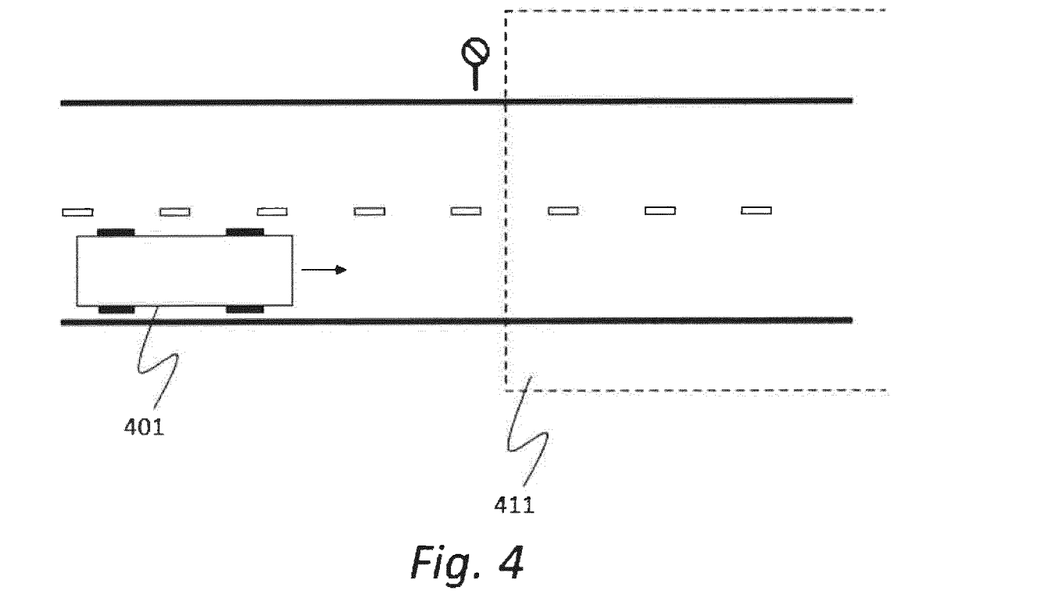

FIG. 4 illustrates a vehicle 401 approaching a zone or segment 411 in accordance with an exemplary embodiment of the present invention. The vehicle 401 in this exemplary embodiment being a hybrid electric bus 401 i.e. comprising two means of propulsion; an internal combustion engine and an electric motor. Thus, an operating parameter for the bus 401 may be to select drive mode, i.e. electric, internal combustion engine or a combination. In this illustrative example the bus 401 is determined to be approaching a zero emission zone 411. The determining whether the bus 401 is approaching the zone 411 can be done in accordance with previously described examples and is for the sake of brevity omitted here. Next, an ECU within the bus 401 accesses a database comprising historical data of passages through the zone 411 performed by the bus 401 or by other vehicles. The historical data may contain information about energy consumption by various devices and systems of a vehicle during a passage, and moreover, the historical data may contain expected energy consumption for these various devices and systems. For example the database may comprise information about the energy consumption for the climate control unit, doors, power steering (steering servo), propulsion motor, etc.

Further, as previously mentioned the historical data may be tagged with different tags, e.g. weather condition, type of vehicle, time of day, day, month, etc. Accordingly, the ECU may search the database mainly for information with appropriate tags, e.g. the same time of day, same type of vehicle. For example, information about how many times the bus doors open when stopping at the bus stops within the zone during this time of day and day of week. Every time the doors open there is some consumption of pressurized air and energy consumption by the climate control unit. Thus, great precision or accuracy may be achieved in the energy consumption predictions for the bus 401 and the energy control system(s) of the bus 401 can accordingly prepare/adapt the system(s) of the bus before reaching the zone 411.

Such preparations/adaptations may be to charge the energy storage unit of the bus 401, or alternatively, prevent the onboard energy storage unit from discharging so to comply with the zero emission requirements dictated by the zone 411 in such a manner which also allows for slower deterioration of the onboard energy storage unit. Another example of preparations/adaptations may be to charge the compressed air tanks of the bus 401 by running an air compressor prior to entering the zone 411, not only in order to reduce energy consumption while traveling in the zone 411, but also in such a way so that maintenance costs of the air compressor can be minimized. Another example of preparations/adaptations may be to allow the exhaust system to increase in temperature (e.g. by late fuel injection, controlling the intercooler temperature, using a waste-gate, avoiding to run the engine at low loads with cold exhaust gases, etc.) to a temperature so that the system is still warn when the combustion is supposed to start operating again after a passage through the zero emission zone 411 has been completed. The temperature adaptation according to this last example is accordingly based on historical data comprising information about previous passages performed by other buses or the same bus 401, at this time of year, this day of the week and more specifically, the status of the exhaust system once the passages were completed. Thus, using historical data will ensure that the exhaust system temperature is adapted in an optimal manner right at the point before the combustion engine is turned off and the bus 401 switches to electric drive.

Figure 5:
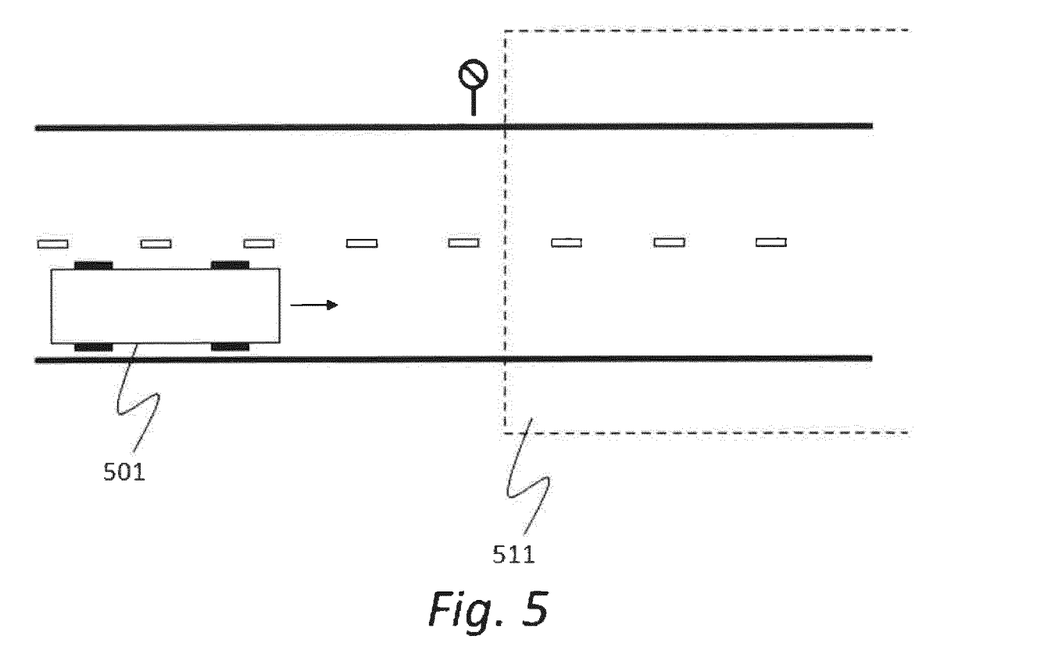
FIG. 5 illustrates a vehicle approaching a low noise zone, as viewed from above in accordance with an embodiment of the present invention.

FIG. 5 illustrates a vehicle 501 approaching a zone or segment 511 in accordance with another exemplary embodiment of the present invention. The vehicle 501 in this exemplary embodiment is a hybrid electric bus 501. Thus, an operating parameter for the bus 501 may be to select drive mode, i.e. electric, internal combustion engine or a combination. In this illustrative example the bus 501 is determined to be approaching a low noise zone 511, i.e. there is a restriction on how loud a vehicle is allowed to be while traveling through the zone 511. The determining whether the bus 501 is approaching the zone 511 can be done in accordance with previously described examples and is for the sake of brevity omitted here.

Before the bus 501 enters the low noise, zone 511 an ECU of the bus may access/retrieve historical data from a database regarding use of high noise devices, such as, e.g. e.g. motor, compressor, power steering, cooling fans, etc. of the bus 501 (e.g. if a reoccurring route) and/or other vehicles provided that they have completed a passage through the zone 511 and uploaded the information to the database. Further, after accessing vehicle data so to determine current status of the high noise devices an analysis of all the data may be performed in order to determine which adaptations of operating parameters are to be done in order to prepare for a passage through the low noise zone 511.

For example, the hybrid electric bus 501 may run the internal combustion engine in order to charge the onboard energy storage unit, to ensure that there is sufficient charge stored in order to accomplish a passage through the zone 511 in compliance with the low noise requirements. For example, the operating parameters of the bus 501 may be adapted in order to travel through the zone 511 using both the internal combustion engine and the electric motor. However, in order to comply with the low noise requirement, the internal combustion engine runs with limited RPM and load and the electric motor is used to assist the internal combustion engine, making sure that enough torque is provided for the bus 501. Thus, the energy level of the onboard energy storage unit is adapted in accordance with the predicted need of the electric motor. In another example, the radiators are operated as a precautionary measure in order to bring down the engine temperature at a low enough level so that the engine coolant does not require an activation of the rotary fans of the radiator during the passage through the zone 511. In a similar manner precautionary measures may be taken concerning the air compressor, battery cooling system, power electronics, power steering and any other devices emitting noises which run the risk of transgressing the low noise requirement in the zone 511.

Figure 6:
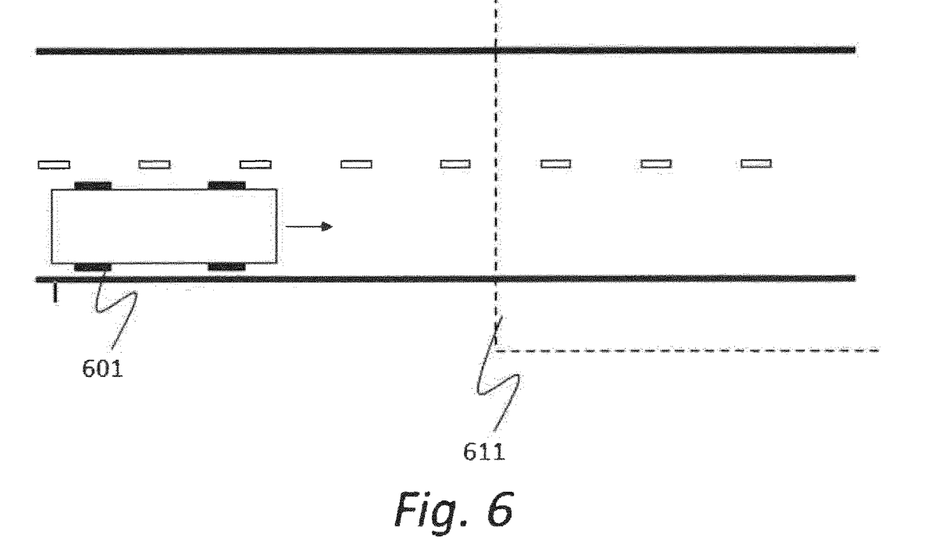
FIG. 6 illustrates a vehicle approaching a safety zone, as viewed from above, in accordance with an embodiment of the present invention.

FIG. 6 illustrates a vehicle 601 approaching a zone or segment 611 in accordance with another exemplary embodiment of the present invention. The vehicle 601 in this exemplary embodiment is a hybrid electric bus 601. Thus, an operating parameter for the bus 601 may be to select drive mode, i.e. electric or internal combustion engine. The exemplary embodiment associated with FIG. 6 serves to elucidate an exemplary embodiment of the invention where the zone is not a predetermined zone, e.g. stored in map data of a navigational system, but rather a result of an analysis of historical data associated with a particular geographic area.

For example, a subsystem in the vehicle 601 may request information regarding safety relevant events of a road segment 611 or a zone 611 being approached by the vehicle 601, such as, the number of accidents. This may be extracted from data provided by various accelerometers of a vehicle. As previously mentioned historical data may be tagged with various information pieces or "tags" regarding specific conditions, such as location (e.g. GPS coordinates), thus, the vehicle 601 may retrieve information regarding the number of accident at a particular cross-section ahead. If, the analysis of the historical data regarding safety relevant events would indicate that there is an increased risk, the system may further assess and look for correlation with reference to other "tags", such as weather condition, time of year, time of day, etc.

If a correlation between an increased risk of accidents and some specific weather conditions (retrieved for temperature sensors, active windshield-wipers, etc.), vehicle axle-weight or speed is made/found. Then a complete analysis may be performed which will result in a safety assessment of the road up ahead of the vehicle 601, leading to certain driving requirements e.g. reduced speed at some segments of the road up ahead (safety zones). Meaning that the system may adapt operating parameters of the vehicle 601 while traveling on a specific segment of the road (e.g. down a steep hill); for example, if vehicle data would say that the vehicle 601 is particularly heavy and it is snowing outside, then that vehicle may be forced to travel at a slower speed than it would have been if it was not as heavy, it was dry and warm outside or if it was traveling in a different direction.

Further, in another exemplary embodiment the bus 601 may use real-time data retrieved from the database when collecting safety relevant information about an approaching part/segment 611 of the route. The database may provide e.g. data from wheel-spin sensors, collision avoidance systems and traffic speed from that segment 611 of the route. The most recent data can be as recent as a few seconds old. Assuming that the bus 601 is approaching a school zone 611 where a vehicle ahead of the bus 601 has reported an increased risk of hazards. From historic data from previous days, months and years, the zone 611 was associated with a maximum of 30 km/h restriction. However, based on this more recent information the bus 601 may change the zone restriction to a maximum of 20 km/h restriction. The bus 601 then prepares for the changed zone restriction and enters the zone 611 with the properties required to meet the zone restriction (Maximum of 20 km/h). This example shows that the historical data not only defines the proper zone requirements or restrictions from a statistical historical perspective (30 km/h) but also adapts to close to real time conditions as reported by other vehicles that are reporting to the same database. For example in reference to bus routes, the time tables are often known (e.g. 10 minutes between each bus), thus, it is also known that there will be very recent data available from the previous vehicle traveling along the same line or route. This effectively means that the quality of safety measures can be even further increased.

Figure 7:
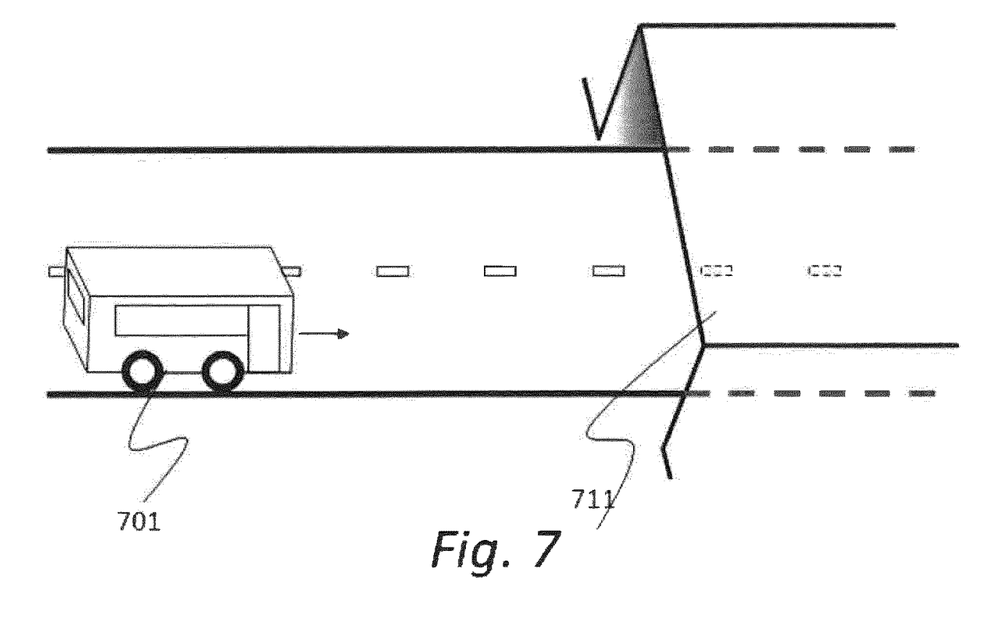
FIG. 7 illustrates perspective view of a vehicle approaching an indoor-driving zone in accordance with an embodiment of the present invention.

FIG. 7 illustrates a vehicle 701 approaching an indoor-driving zone or segment 711 (e.g. a tunnel) in accordance with an embodiment of the present invention. Similarly to the previously described exemplary embodiments, the vehicle 701 may be a hybrid electric bus 711. The bus 701 may be following a fixed reoccurring route, i.e. following a bus line or bus route (e.g. city buses). Prior to reaching the zone 711, which happens to be indoors, a subsystem of the bus 701 accesses a database comprising historical data so to retrieve information about previous passages through the zone 711 performed by either the bus 701 and/or other vehicles.

A restriction associated with indoor-driving zones 711 may for example be zero emission, i.e. the internal combustion engine and heaters (during winter conditions) must be turned off. The historical data may be tagged with various driving conditions, as discussed with reference to other embodiments, which may aid in providing accurate estimations and thus optimal adaptations of the vehicle control strategy/operating parameters. Accordingly, in one illustrative exemplary scenario the bus 701 may be approaching a tunnel 711 during very cold weather conditions, thus, without any restrictions there would be a need to activate the heater while traveling through the tunnel. However, as this is not permitted inside the tunnel 711, the bus 701 would have predicted this based on vehicle data and historical data, and adapted the vehicle control strategy, by activating the heater before entering the tunnel, and then circulate the heated air inside the bus 701 while traveling through the tunnel 711. The temperature of the heating system is decided based on for example: historical data tagged with outside temperature, wind, air pressure corresponding to present vehicle conditions; in order to ensure that there enough warm air is accumulated without any unnecessary losses after a passage through the zone 711 has been completed. Moreover, in association with indoor driving positioning means other than GPS may be needed as signals may be weak, the position or location may then be determined by traveled distance or signals from pressure sensors in order to determine altitude differences.

The present invention has here been disclosed mainly in relation to buses, and more specifically to hybrid electric buses, where it is considered to be particularly advantageous. However, it may also be implemented and used on other on-road vehicles such as cars or trucks.

The invention has now been described with reference to specific embodiments. However several variations of the driving requirements or driving restrictions as they also can be called, are feasible. For example, restrictions may only apply to certain types of vehicles or the restrictions may vary depending on the type of vehicle. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

What is claimed is:

1. A method for adapting a vehicle control strategy of an on-road vehicle following a reoccurring fixed route to a predetermined destination, the fixed route extending through at least one geographical zone defined to have at least one environmental restriction, the method comprising:
    determining that the vehicle is approaching one of the at least one geographical zone,
    verifying that passage through the complete geographical zone complies with the environmental restrictions for the geographical zone,
    accessing a database to acquire historical data collected from previous passages of a plurality of vehicles through the at least one geographical zone, wherein the historical data is tagged based on at least one time related parameter,
    selecting historical data from the database based on a current or forecasted condition of the time related parameter, and
    adapting the vehicle control strategy inside the at least one geographical zone based on the historical data and the environmental restriction, wherein the vehicle control strategy is provided to set at least one operating parameter to control the operation of the vehicle and the operating parameter is a drive mode for the vehicle, allowing the vehicle to select electric or combustion engine propulsion,
    wherein the historical data includes at least energy consumption and required time of passage, and wherein adapting the vehicle control strategy includes adapting the at least one operating parameter for optimizing energy consumption of the vehicle.

2. The method according to claim 1, further comprising accessing an onboard information system to acquire current vehicle data.

3. The method according to claim 1, further comprising receiving current vehicle data from another vehicle travelling along the fixed route.

4. The method according to claim 1, further comprising collecting data during passage of the at least one geographical zone and communicating the collected data to the historical data in the database.

5. The method according to claim 1, further comprising verifying that passage through the at least one geographical zone complies with the environmental restrictions.

6. The method according to claim 1, wherein the historical data further includes payload changes in or along the at least one geographical zone.

7. The method according to claim 1, wherein the fixed route extends through at least one additional geographical zone associated with at least one environmental restriction, and wherein adapting the vehicle control strategy is based also on a requirement of the additional geographical zone and historical data collected from previous passages of one or several vehicles through the additional zone.

8. The method according to claim 1, wherein adapting the vehicle control strategy includes predicting a future delay based on the historical data and updating a time schedule accordingly.

9. The method according to claim 1, wherein the vehicle has a drive mode using an electric energy storage, and wherein the operating parameter is activation/deactivation of regenerative braking.

10. The method according to claim 9, wherein the vehicle is a hybrid vehicle with at least two drive modes.

11. The method according to claim 9, wherein the operating parameter is activation/deactivation of energy consuming onboard subsystems.

12. The method according to claim 9, wherein the operating parameter is scheduling of an onboard electrical energy storage unit by one of combustion engine and external power source.

13. An on-board system for adapting a vehicle control strategy of an on-road vehicle following a reoccurring fixed route to a predetermined destination, the fixed route extending through the at least one geographical zone defined to have at least one environmental restriction, the system comprising:
   a positioning unit for determining when the vehicle is approaching one of the at least one geographical zone based on a determined position of the vehicle, and
   a control unit configured to:
      verify that passage through the complete geographical zone complies with the environmental restrictions for the geographical zone,
      access a database for historical data collected from previous passages of a plurality of vehicles through the at least one geographical zone, wherein the historical data is tagged based on at least one time related parameter,
      select historical data from the database based on a current or forecasted condition of the time related parameter, and
      adapt the vehicle control strategy inside the geographical zone based on the historical data and the environmental restriction, wherein the vehicle control strategy is provided to set at least one operating parameter to control the operation of the vehicle, and the operating parameter is a drive mode for the vehicle, allowing the vehicle to select electric or combustion engine propulsion,
   wherein the historical data includes at least energy consumption and required time of passage, and wherein adapting the vehicle control strategy includes adapting the at least one operating parameter for optimizing energy consumption of the vehicle.

14. The on-board system according to claim 13, wherein the database is remote to the vehicle, and wherein the on-board system includes a communication interface allowing the control unit to access the database.

15. The on-board system according to claim 13, wherein the database forms part of the on-board system.

16. The on-board system according to claim 13, wherein the control unit is further configured to receive current vehicle data from another vehicle travelling along the fixed route.

17. The on-board system according to claim 13, wherein the control unit is further configured to predict a future delay based on the historical data and updating a time schedule accordingly.

18. The on-board system according to claim 13, further comprising an information system for acquiring current vehicle data, and wherein the control unit is further configured to access the information system.

19. The on-board system according to claim 18, wherein the control unit is further configured to communicate the current vehicle data and/or the determined position to the database.

* * * * *